United States Patent
Son et al.

(10) Patent No.: US 9,767,737 B2
(45) Date of Patent: Sep. 19, 2017

(54) LIQUID CRYSTAL DISPLAY APPARATUS AND METHOD OF DRIVING THE SAME

(71) Applicant: Samsung Display Co., Ltd., Yongin-si, Gyeonggi-Do (KR)

(72) Inventors: Jongho Son, Yongin (KR); Kyunghee Lee, Yongin (KR); Kangseob Jeong, Yongin (KR); Joonhyung Park, Yongin (KR); Keunchan Oh, Yongin (KR)

(73) Assignee: Samsung Display Co., Ltd., Samsung-ro, Giheung-Gu, Yongin-si, Gyeonggi-Do (KR)

( * ) Notice: Subject to any disclaimer, the term of this patent is extended or adjusted under 35 U.S.C. 154(b) by 27 days.

(21) Appl. No.: 14/816,738

(22) Filed: Aug. 3, 2015

(65) Prior Publication Data
US 2016/0155390 A1 Jun. 2, 2016

(30) Foreign Application Priority Data

Dec. 1, 2014 (KR) ........................ 10-2014-0169966

(51) Int. Cl.
*G09G 3/34* (2006.01)
*G02F 1/1335* (2006.01)
(Continued)

(52) U.S. Cl.
CPC ......... *G09G 3/3413* (2013.01); *G02B 6/0068* (2013.01); *G02B 6/0073* (2013.01); *G02F 1/133514* (2013.01); *G02F 1/133603* (2013.01); *G02F 1/133621* (2013.01); *G09G 3/2003* (2013.01); *G09G 2300/0452* (2013.01); *G09G 2320/0238* (2013.01);
(Continued)

(58) Field of Classification Search
None
See application file for complete search history.

(56) References Cited

U.S. PATENT DOCUMENTS 6,862,012 B1 * 3/2005 Funakoshi ........... G09G 3/2092
345/101
7,352,419 B2 4/2008 Tanose et al.
(Continued)

FOREIGN PATENT DOCUMENTS

KR 10-0808329 B1 6/2005

*Primary Examiner* — Dismery Mercedes
(74) *Attorney, Agent, or Firm* — Robert E. Bushnell, Esq.

(57) ABSTRACT

A liquid crystal display apparatus includes a backlight configured to emit red light, green light, and blue light for forming an image, a liquid crystal panel including a plurality of pixels through which light components supplied by the backlight respectively pass, configured to control transmittances of the plurality of pixels to form an image, and a backlight controller configured to control respective intensities of the red light, the green light, and the blue light emitted by the backlight. The backlight controller is configured to compensate for a black color coordinate value generated with respect to a predetermined color by controlling the backlight such that a second red light intensity and a second green light intensity are larger than a first red light intensity and a first green light intensity and a second blue light intensity are smaller than a first blue light intensity. A black color coordinate value may be made correspond to a white color coordinate value.

16 Claims, 10 Drawing Sheets

(51) Int. Cl.
*F21V 8/00* (2006.01)
*G09G 3/20* (2006.01)

(52) U.S. Cl.
CPC ............ *G09G 2320/0242* (2013.01); *G09G 2320/0666* (2013.01); *G09G 2360/145* (2013.01)

(56) References Cited

U.S. PATENT DOCUMENTS

| | | | |
|---|---|---|---|
| 7,489,374 B2 | 2/2009 | Utsumi et al. | |
| 8,089,583 B2 | 1/2012 | Li et al. | |
| 8,248,555 B2* | 8/2012 | Senoue | G02F 1/13362 349/62 |
| 8,289,264 B2* | 10/2012 | So | G09G 3/3413 345/102 |
| 8,442,316 B2* | 5/2013 | Bassi | G06T 5/008 345/55 |
| 8,629,831 B2* | 1/2014 | Park | G09G 3/3413 345/102 |
| 2003/0011832 A1* | 1/2003 | Chang | G01J 1/32 358/518 |
| 2005/0128381 A1* | 6/2005 | Tanose | G02F 1/133512 349/106 |
| 2007/0177085 A1* | 8/2007 | Nishiyama | G02F 1/133371 349/117 |
| 2008/0094550 A1* | 4/2008 | Tawaraya | G02F 1/133514 349/106 |
| 2010/0188611 A1* | 7/2010 | Wang | G02F 1/133603 349/68 |
| 2011/0096084 A1* | 4/2011 | Hu | G09G 3/3413 345/589 |
| 2012/0056911 A1* | 3/2012 | Safaee-Rad | G09G 3/2003 345/690 |
| 2013/0241962 A1* | 9/2013 | Cha | G09G 3/003 345/690 |
| 2016/0014301 A1* | 1/2016 | Wang | H04N 1/4074 358/464 |

* cited by examiner

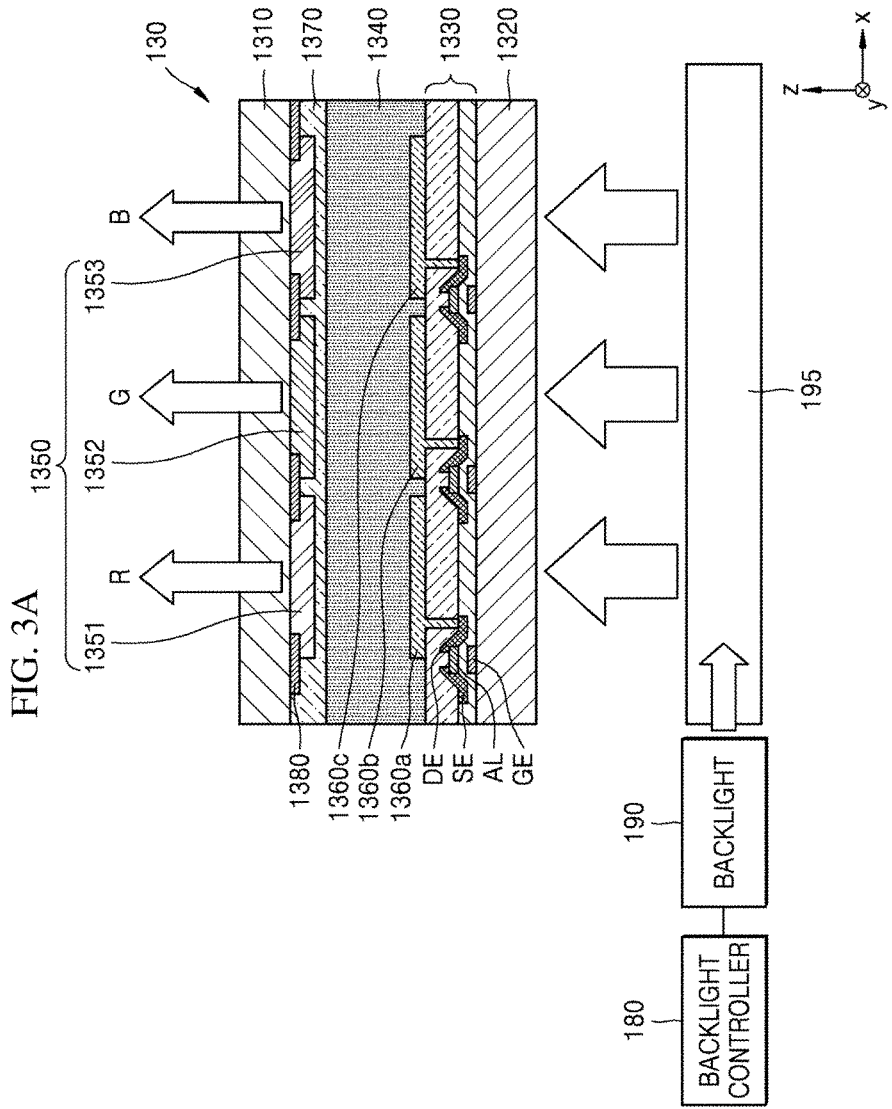

LIQUID CRYSTAL DISPLAY APPARATUS AND METHOD OF DRIVING THE SAME

CLAIM OF PRIORITY

This application claims the priority of and all the benefits accruing under 35 U.S.C. §119 of Korean Patent Application No. 10-2014-0169966, filed on Dec. 1, 2014, in the Korean Intellectual Property Office (KIPO), the disclosure of which is incorporated herein in its entirety by reference.

BACKGROUND OF THE INVENTION

Field of Disclosure

One or more exemplary embodiments relate to a liquid crystal display apparatus and a method of driving the same.

Description of the Related Art

A liquid crystal display apparatus is one of currently the most widely used flat panel display apparatuses and includes a lower substrate on which pixel electrodes are formed, an upper substrate on which a common electrode is formed, and a liquid crystal layer inserted between the two substrates.

When a voltage is applied between the pixel electrodes and the common electrode, an electric field is formed in the liquid crystal layer. The formed electric field changes arrangement of liquid crystal molecules that form the liquid crystal layer so that polarization of light that passes through the liquid crystal layer changes. An amount of light that passes through a polarizing plate varies in accordance with the change in polarization of the light that passes through the liquid crystal layer. Since the amount of the light that passes through the polarizing plate may be changed by controlling a magnitude of the electric field formed in the liquid crystal layer, an image may be displayed by using the change in light amount.

Transmittance may vary in accordance with a wavelength due to wavelength dispersion of light incident on the liquid crystal layer. Therefore, color coordinates on the same color including different grayscales may vary.

SUMMARY OF THE INVENTION

According to one or more exemplary embodiments, a liquid crystal display apparatus includes a backlight configured to emit red light, green light, and blue light for forming an image, a liquid crystal panel including a plurality of pixels through which light components supplied by the backlight respectively pass, configured to control transmittances of the plurality of pixels to form an image, and a backlight controller configured to control respective intensities of the red light, the green light, and the blue light emitted by the backlight. The backlight controller is configured to compensate for a black color coordinate value generated with respect to a predetermined color by controlling the backlight such that a second red light intensity and a second green light intensity are larger than a first red light intensity and a first green light intensity and a second blue light intensity are smaller than a first blue light intensity.

The backlight controller is configured to control the backlight so that any change of a white color coordinate value and the compensated black color coordinate value generated with respect to the predetermined color remain within a predetermined range.

The liquid crystal panel further includes a data driver configured to control data voltages applied to the plurality of pixels and control transmittances of the plurality of pixels. The data driver is configured to control the data voltages so that a color coordinate value having an intermediate grayscale with respect to the predetermined color corresponds to the white color coordinate value.

The backlight includes a red light-emitting diode configured to emit the red light, a green light-emitting diode configured to emit the green light, and a blue light-emitting diode configured to emit the blue light.

The backlight controller is configured to control currents applied to the red light-emitting diode, the green light-emitting diode, and the blue light-emitting diode to control the intensity of the red light, the intensity of the green light, and the intensity of the blue light.

A liquid crystal display apparatus includes a liquid crystal panel including a plurality of pixels and a backlight configured to emit light toward the liquid crystal panel. Each of the plurality of pixels includes a liquid crystal layer and red, green, and blue color filters configured to filter light that passes through the liquid crystal layer and transmit red, green, and blue light components, and transmittance of the blue color filter is smaller than that of the green color filter and that of the red color filter.

The transmittances of the blue color filter, the green color filter, and the red color filter are determined so that any change in a color coordinate value of the predetermined color remain within a predetermined range during a change from a black color coordinate value to a white color coordinate value.

The liquid crystal panel further includes a data driver configured to control data voltages applied to the plurality of pixels and control transmittances of the plurality of pixels. The data driver is configured to control the data voltages so that a color coordinate value generated when an intermediate grayscale is formed with respect to the predetermined color corresponds to the white color coordinate value.

The blue color filter is thicker than the green color filter and thicker than the red color filter.

According to one or more exemplary embodiments, a method of driving the liquid crystal display apparatus of claim 1 includes measuring the white color coordinate value, comparing a black color coordinate value stored in a memory with the white color coordinate value to calculate a compensation signal, and adjusting the black color coordinate value based on the compensation signal until the black color coordinate value corresponds to the white color coordinate value.

The method further includes adjusting a color coordinate value until the color coordinate value having an intermediate grayscale correspond to the white color coordinate value.

The compensation signal is calculated by detecting a first red light intensity, a first green light intensity, and a first blue light intensity at a black color coordinate value, making a second red light intensity and a second green light intensity larger than the first red light intensity and the first green light intensity at the black color coordinate value, and making a second blue light intensity smaller than the first blue light intensity at the black color coordinate value.

In the liquid crystal display apparatus according to the exemplary embodiments, the color coordinates on all the grayscales with respect to the same color may be made the same.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein:

FIG. 3A is a cross-sectional view of the liquid crystal display apparatus according to an exemplary embodiment;

DETAILED DESCRIPTION OF THE INVENTION

Figure 1:
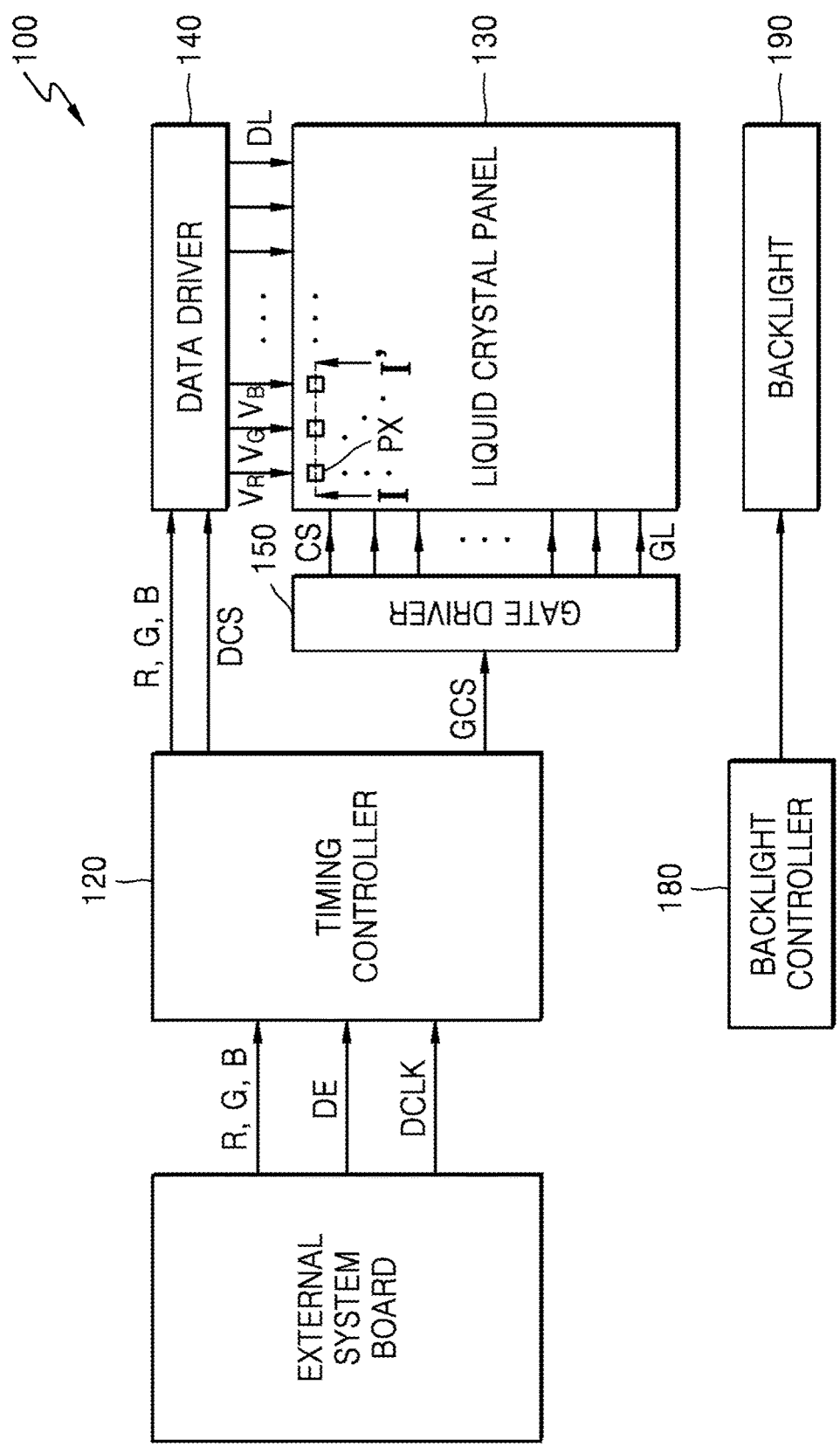
FIG. 1 is a block diagram of a liquid crystal display apparatus according to an exemplary embodiment.

Reference will now be made in detail to exemplary embodiments, examples of which are illustrated in the accompanying drawings. In this regard, the present exemplary embodiments may have different forms and should not be construed as being limited to the descriptions set forth herein.

The same reference numerals in different drawings represent the same element, and thus their description will not be given.

The terms first and second, etc., are only used to distinguish one element from another element.

Unless otherwise defined, a singular term may represent a plural term.

Unless otherwise defined, terms such as "include" and "have" are for representing that characteristics or elements described in the specification exist. It may be interpreted that one or more other characteristics or elements may be added.

It will also be understood that when a layer is referred to as being "on" another layer, it can be directly on the other layer, or intervening layers may also be present.

In the drawings, the thicknesses of elements are exaggerated for clarity.

When a certain embodiment may be differently implemented, a specific process may be performed in an order different from a described order. For example, continuously described two processes may be simultaneously performed and may be performed in an order opposite to a described order.

Figure 2:
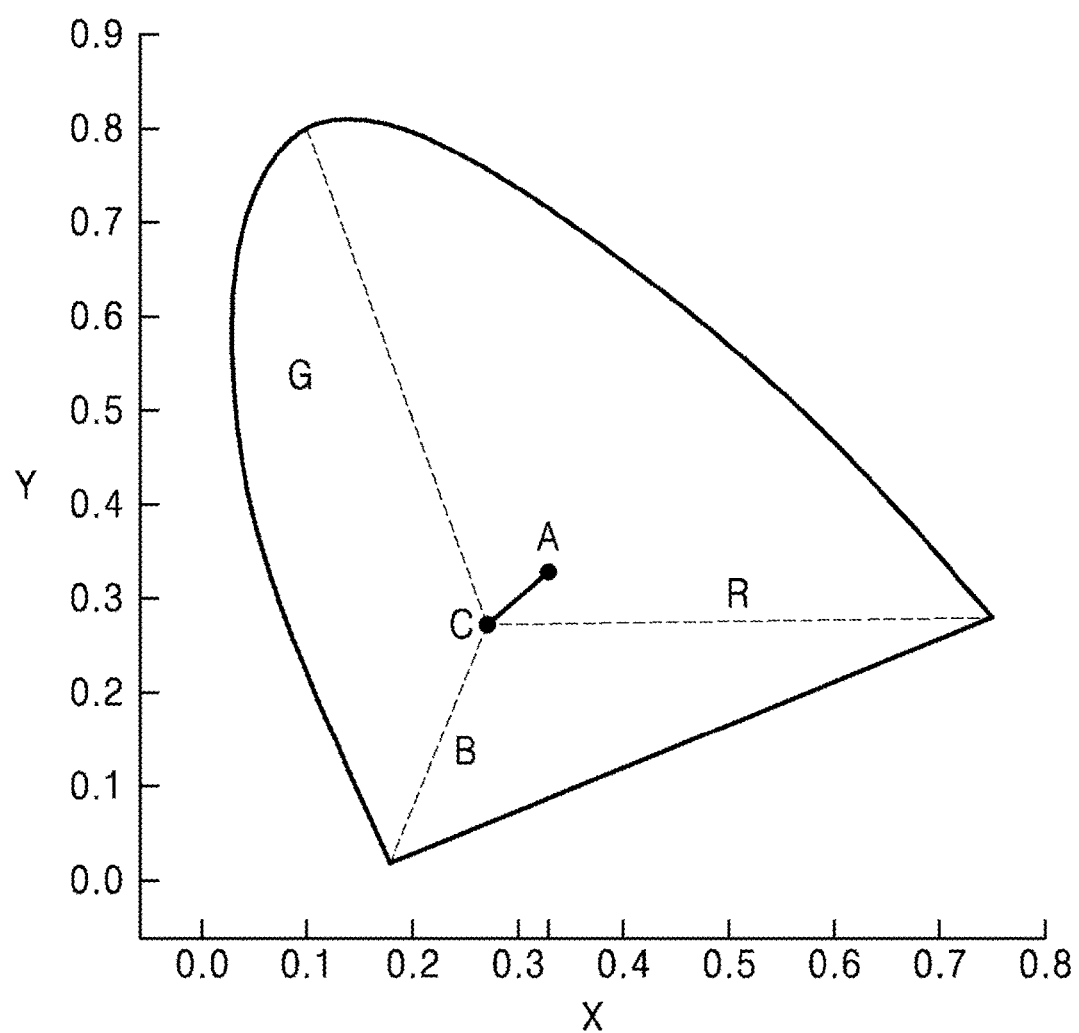
FIG. 2 is a two-coordinate graph of x and y color coordinates for describing an exemplary embodiment.

FIG. 1 is a block diagram of a liquid crystal display apparatus 100 according to an exemplary embodiment. FIG. 2 is a two-coordinate graph of x and y color coordinates for describing an exemplary embodiment.

Referring to FIG. 1, the liquid crystal display apparatus 100 may include a liquid crystal panel 130 including pixels PX that display an image, a data driver 140, a gate driver 150, a backlight 190 for emitting light behind a rear surface of the liquid crystal panel 130, and a backlight controller 180 for controlling driving of the backlight 190.

The liquid crystal panel 130 may include a liquid crystal layer between two glass substrates, a plurality of data lines DL and a plurality of gate lines GL that intersect, and the plurality of pixels PX arranged in a matrix. The plurality of pixels PX are connected to the plurality of data lines DL and the plurality of gate lines GL. The pixels PX may be referred to as liquid crystal cells. The pixels PX of the liquid crystal panel 130 are connected to thin film transistors (TFT) having drain electrodes DE, source electrodes SE, semiconductor active layer AL, and gate electrodes GE and are driven by an electric field between pixel electrodes and a common electrode.

In a vertical electric field driving method such as a twisted nematic (TN) mode and a vertical alignment (VA) mode, the common electrode is formed on the upper glass substrate. In a horizontal electric field driving method such as an in plane switching (IPS) mode and a fringe field switching (FFS) mode, the common electrode is formed on the lower glass substrate together with the pixel electrodes. A polarizing plate is attached onto the upper glass substrate of the liquid crystal panel 130 and an alignment layer for setting a pre-tilt angle of liquid crystal is formed on the lower glass substrate of the liquid crystal panel 130.

The data driver 140 converts input image signals R, G, and B into data voltages $V_R$, $V_G$, and $V_B$ and supplies the data voltages $V_R$, $V_G$, and $V_B$ to the pixels PX. The gate driver 150 supplies gate signals GS to the pixels PX. The data driver 140 and the gate driver 150 are controlled by a data control signal DCS and a gate control signal GCS supplied by the timing controller 120. The timing controller 120 receives timing signals such as a data enable signal DE and a pixel or dot clock signal DCLK from an external system board (FIG. 1). The timing controller 120 generates the data control signal DCS for controlling operation timing of the data driver 140 and the gate control signal GCS for controlling operation timing of the gate driver 150 in response to the timing signals.

The backlight 190 may include at least one light source among a cold cathode fluorescent lamp (CCFL), an external electrode fluorescent lamp (EFFL), and at least one light-emitting device (LED). The backlight 190 may be controlled by the backlight controller 180. The backlight controller 180 generates a backlight control signal corresponding to a dimming signal by using an operation power source input from the external system board. The backlight controller 180 may be an inverter or an LED drive in accordance with a kind of the light source.

When the liquid crystal display apparatus 100 is driven by inputting the data voltages $V_R$, $V_G$ and $V_B$ and the gate signals to the pixels PX of the liquid crystal panel 130, due to wavelength dispersion of the liquid crystal layer included in the liquid crystal panel 130, a color coordinate value (hereinafter, referred to as "a white color coordinate value") with respect to the same color in which all the RGBs have grayscale 255 may be different from a color coordinate value (hereinafter, referred to as "a black color coordinate value") with respect to the same color in which all the RGBs have grayscale 0. For example, in the liquid crystal display apparatus 100 in the horizontal electric field driving method in which the common electrode is formed on the lower glass substrate together with the pixel electrodes, liquid crystal transmittance T may be defined by following EQUATION 1.

$$T = T_0 \sin^2(2\alpha)\sin^2[(\pi d \Delta n)/\lambda] \quad \text{[EQUATION 1]}$$

In an initial alignment state, when a long-axis direction angle α of liquid crystal is π/8 so that the liquid crystal has the maximum transmittance, the liquid crystal transmittance T may be defined by following EQUATION 2.

$$T = T_0/2 \sin^2[(\pi d \Delta n)/\lambda], \alpha = \pi/8 \quad \text{[EQUATION 2]}$$

Referring to the EQUATIONS 1 and 2, the liquid crystal transmittance T of the liquid crystal display apparatus 100 may be determined by phase delay in accordance with a wavelength λ in parenthesis. In general, transmittance by wavelength as a unique characteristic of a liquid crystal material is maximal in light (hereinafter, referred to as "green light") of a green wavelength band and is reduced toward light (hereinafter, referred to as "red light") of a red wavelength band and light (hereinafter, referred to as "blue light") of a blue wavelength band. As described above, the transmittance of the liquid crystal varies in accordance with the wavelength band because the dispersion of the liquid crystal material varies in accordance with the wavelength band. Due to the wavelength dispersion of the liquid crystal material, the color coordinate value with respect to the same color may vary in accordance with a difference in grayscale.

For example, referring to the xy color coordinates illustrated in FIG. 2, a black color coordinate value C with respect to an arbitrary color may be determined. The black color coordinate value C is not affected by the wavelength dispersion of the liquid crystal material. When grayscale with respect to the same color as that formed in the black color coordinate value C is increased, the color coordinate value may be moved to the green wavelength band and the red wavelength band having high transmittances. Such a phenomenon continuously occurs until the color coordinate value reaches the white color coordinate value A. In order to compensate for non-coincidence of the color coordinate values, in a conventional art, the data voltages $V_R$, $V_G$, and $V_B$ transmitted to the respective pixels PX by the data driver 140 in color coordinate values including intermediate grayscales C⇆A, that is, the data voltages $V_R$ and $V_G$ of the green light and the red light are more applied than the data voltage $V_B$ of the blue light so that the color coordinate values including the intermediate grayscales C←→A may be made the same as the white color coordinate value A. However, since an additional data voltage is not applied to the black color coordinate value C, the method of compensating for the color coordinates by using the data voltages $V_R$, $V_G$, and $V_B$ may not be used for compensating for the black color coordinate value C.

In order to make color coordinates with respect to all the grayscales including the black color coordinate value C the same, intensity of external light, that is, light applied by the backlight may be controlled or transmittance of a color filter may be controlled.

Figure 3B:
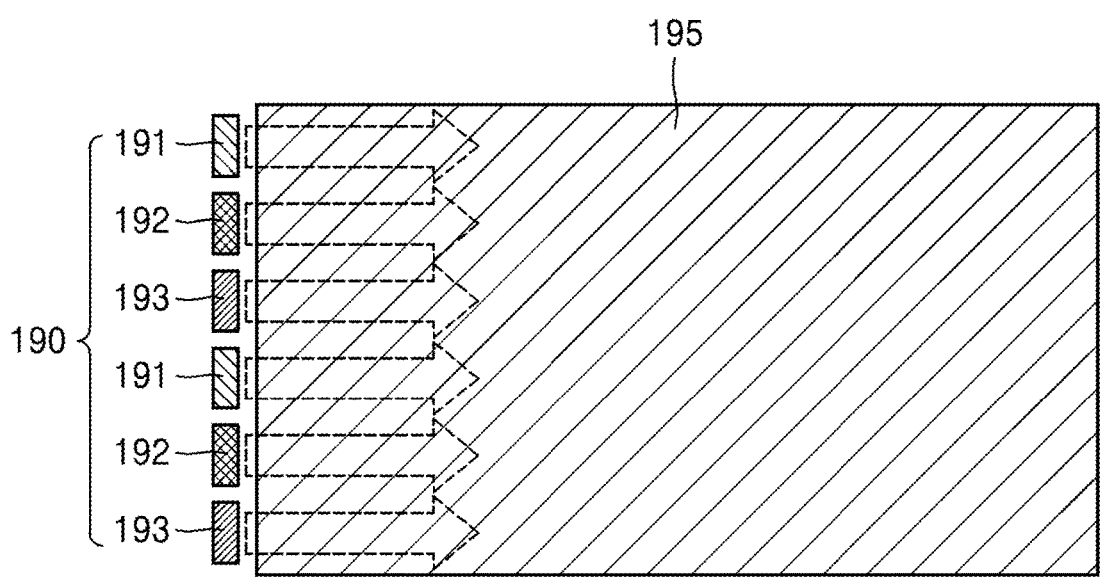
FIG. 3B is a front view of a backlight illustrating arrangement of a light source of the backlight of FIG. 3A.

FIG. 3A is a cross-sectional view of the liquid crystal display apparatus 100 according to the exemplary embodiment. FIG. 3B illustrates an example of arrangement of a light source of the backlight 190 of FIG. 3A. In FIG. 3A, only the backlight 190 and the liquid crystal panel 130 are simply illustrated.

Referring to FIGS. 3A and 3B, the liquid crystal panel 130 may include a color filter 1350 including red color filter 1351, green color filter 1352, and blue color filter 1353, and a liquid crystal layer 1340. In addition, the liquid crystal panel 130 may have an electrode structure in which arrangement of the liquid crystal of the liquid crystal layer 1340 is driven in units of pixels or sub-pixels. For example, the liquid crystal panel 130 may include first and second substrates 1310 and 1320, a driver 1330 including TFTs on the second substrate 1320, the pixel electrodes electrically connected to the TFTs of the driver 1330, the liquid crystal layer 1340 positioned between the first and second substrates 1310 and 1320, a common electrode 1370 provided in the first substrate 1310, and the color filter 1350 provided in the second substrate 1320. The pixel electrodes may include three sub-pixel electrodes 1360a, 1360b, and 1360c and the TFTs may be arranged to correspond to the three sub-pixel electrodes 1360a, 1360b, and 1360c. That is, the three TFTs and the three sub-pixel electrodes 1360a, 1360b, and 1360c may be included in one pixel.

The backlight 190 according to the exemplary embodiment may include a blue light-emitting diode 191 as a first light source for emitting one color-light, for example, blue light, a red light-emitting diode 192 as a second light source for emitting red light, and a green light-emitting diode 193 as a third light source for emitting green light. A light guiding plate 195 guides light incident from the blue light-emitting diode 191, the red light-emitting diode 192, and the green light-emitting diode 193 and may output the guided light in a direction of a surface of the liquid crystal panel 130.

Here, it is exemplarily illustrated that the backlight 190 includes the blue light-emitting diode 191, the red light-emitting diode 192, and the green light-emitting diode 193 as the first, second, and third light sources. However, the first, second, and third light sources may be formed of combinations of various color-light sources or combinations of one color-light source and a white light source in a range in which the liquid crystal display apparatus 100 according to the exemplary embodiment may implement a color image.

The backlight controller 180 is electrically connected to the respective light sources 191, 192, and 193 of the backlight 190 and may control time durations of lighting and light intensities. For example, as illustrated in FIG. 3, when the backlight 190 includes the blue light-emitting diode 191, the red light-emitting diode 192, and the green light-emitting diode 193, the backlight controller 180 controls time durations spent on applying a current to the light sources 191, 192, and 193 and current intensities and may respectively control the lighting times and light intensities of the light sources 191, 192, and 193. A method of making the black color coordinate value C correspond to the white color coordinate value A by controlling the light intensities of the light sources 191, 192, and 193 will be described later with reference to FIGS. 4 and 5.

Figure 4:
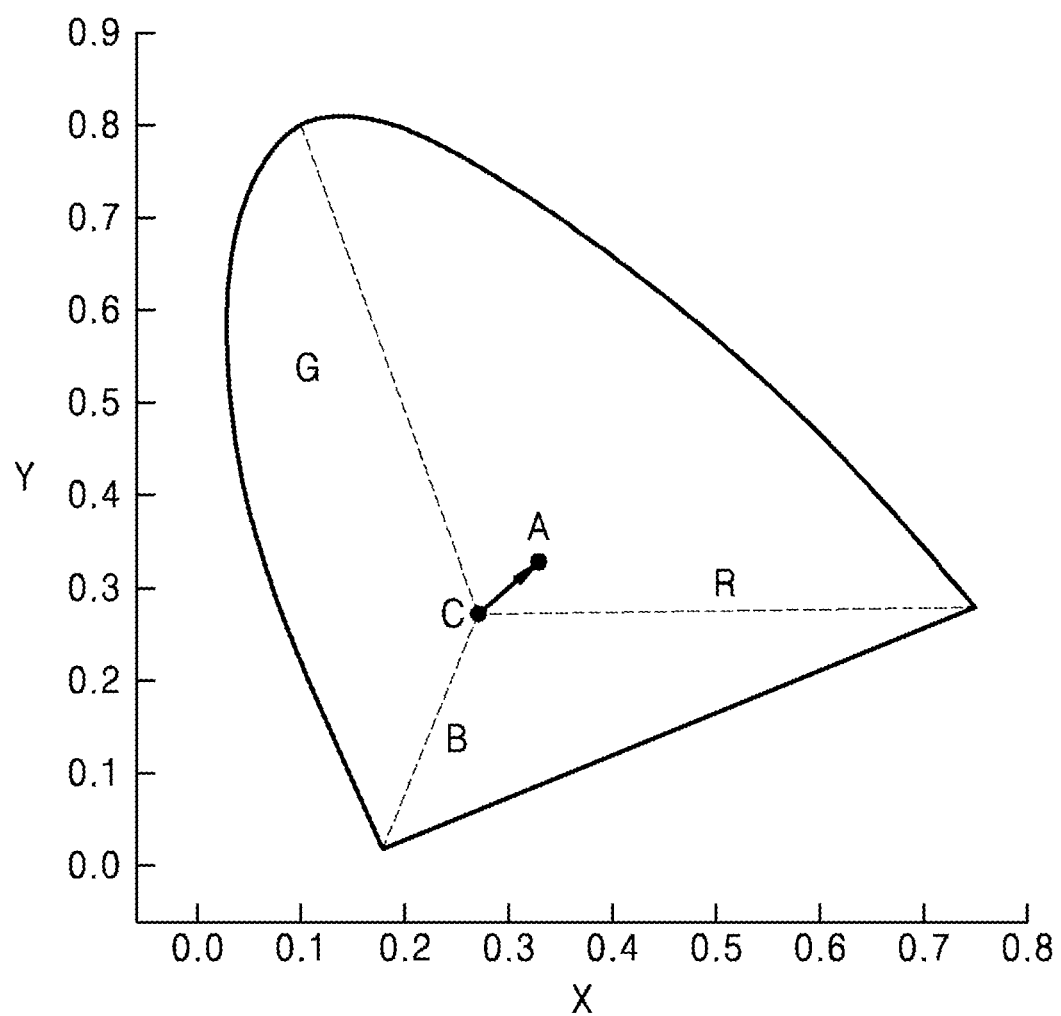
FIG. 4 is a two-coordinate graph of x and y color coordinates for describing an exemplary embodiment.
Figure 5:
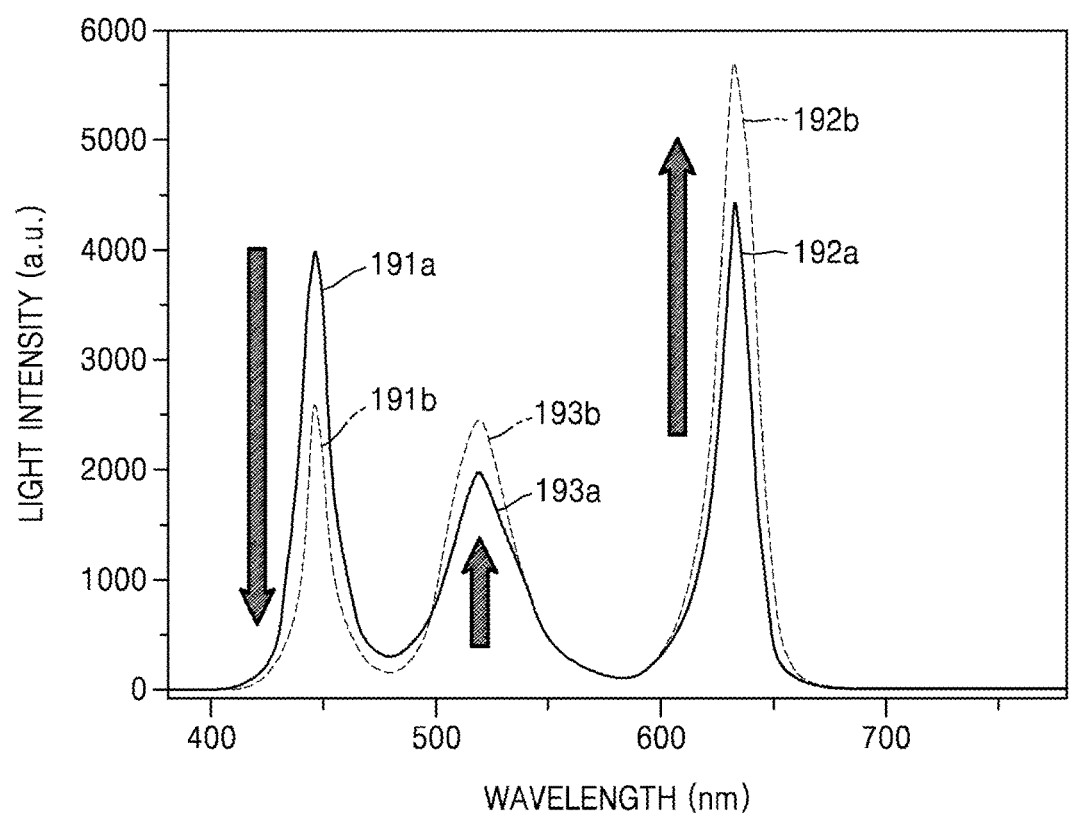
FIG. 5 is a graph with respect to light intensity of a backlight according to an exemplary embodiment.

FIG. 4 is a two-coordinate graph of x and y color coordinates for describing an exemplary embodiment. FIG. 5 is a graph with respect to light intensity of a backlight according to an exemplary embodiment.

Referring to FIGS. 4 and 5, light components emitted by applying a predetermined current or voltage to the backlight 190, for example, the blue light-emitting diode 191, the red light-emitting diode 192, and the green light-emitting diode 193 are combined after passing through the liquid crystal panel 130 so that reference light components having predetermined colors and grayscales may be formed. For example, in the black color coordinate value C illustrated in FIG. 4 in which all the RGBs have the grayscale 0, the blue light-emitting diode 191, the red light-emitting diode 192, and the green light-emitting diode 193 may respectively emit light components with intensities of the reference light components, that is, a first blue light intensity 191a, a first red light intensity 192a, and a first green light intensity 193a. At this time, the white color coordinate value A in which all the RGBs have the grayscale 255 may be also formed by the first blue light intensity 191a, the first red light intensity 192a, and the first green light intensity 193a. For example, the white color coordinate value A may be (0.31-0.33, 0.31-0.33).

The black color coordinate value C with respect to a predetermined color on color coordinates may correspond to the white color coordinate value A by controlling the intensities of the light components of the light sources 191, 192, and 193. For example, the first blue light intensity 191a of the blue light-emitting diode 191, the first red light intensity 192a of the red light-emitting diode 192, and the first green light intensity 193a of the green light-emitting diode 193 that are combined in the black color coordinate value C may be the same. At this time, when transmittances of the liquid crystal layer 1340 and the color filter 1350 are maintained to be the same, the black color coordinate value C with respect to the predetermined color on the color coordinates may correspond to the white color coordinate value A by reducing the light intensity of the blue light-emitting diode 191 from the first blue light intensity 191a to a second blue light intensity 191b, increasing the light intensity of the red light-emitting diode 192 from the first red light intensity 192a to a second red light intensity 192b, and increasing the light intensity of the green light-emitting diode 193 from the first green light intensity 193a to a second green light intensity 193b.

Here, the first and second blue light intensities 191a and 191b, the first and second red light intensities 192a and 192b, and the first and second green light intensities 193a and 193b do not mean absolute numerical values. The first blue light intensity 191a, the first red light intensity 192a, and the first green light intensity 193a that are the reference light components may be determined in accordance with a position of the black color coordinate value C. Differences between the first and second blue light intensities 191a and 191b, the first and second red light intensities 192a and 192b, and the first and second green light intensities 193a and 193b may be determined in accordance with a difference between the black color coordinate value C and the white color coordinate value A.

Figure 6:
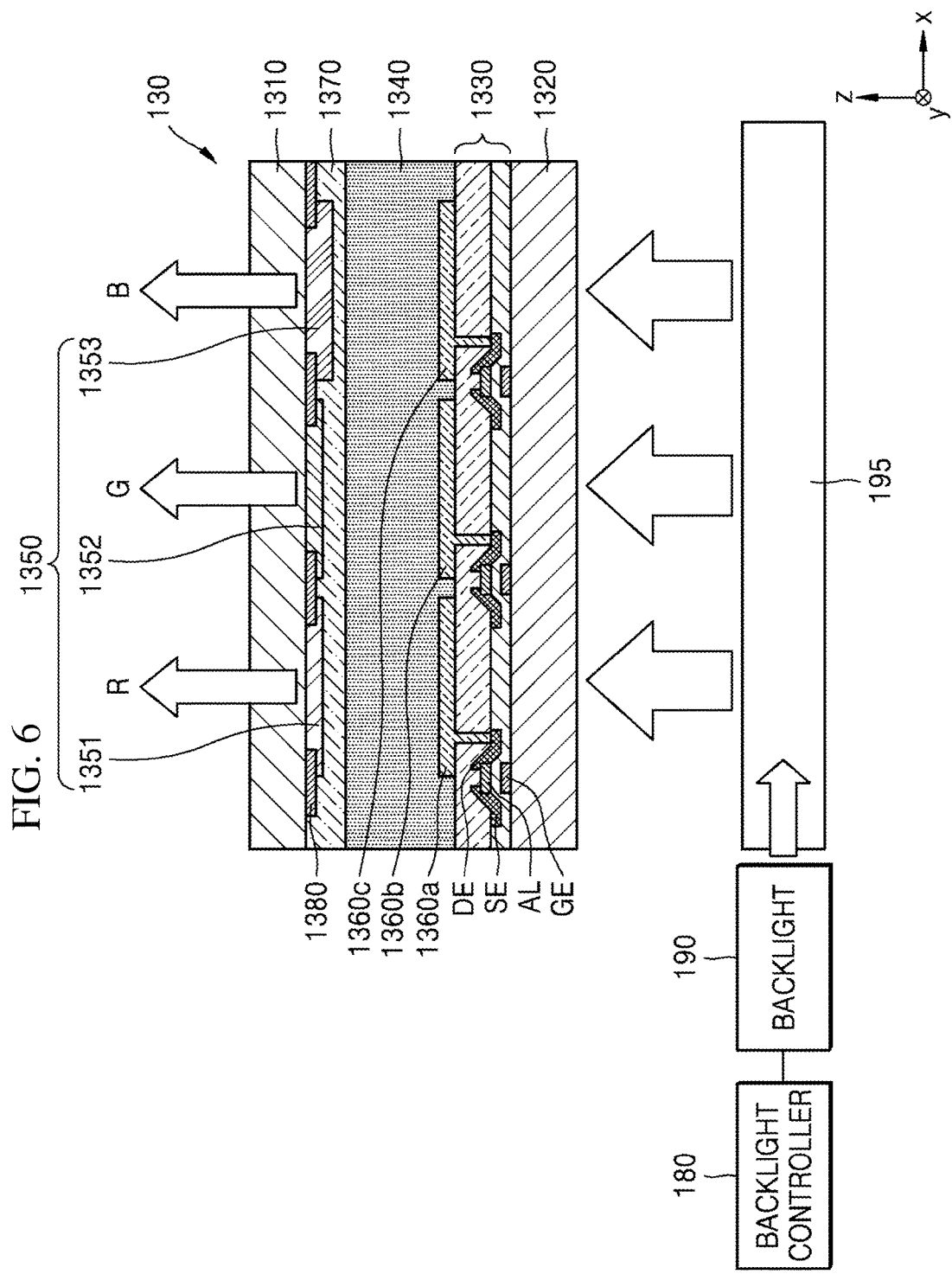
FIG. 6 is a cross-sectional view of the liquid crystal display apparatus according to the exemplary embodiment.

FIG. 6 schematically illustrates the liquid crystal panel 130 that may be applied to the liquid crystal display apparatus 100 according to the exemplary embodiment and a driving principle of the liquid crystal panel 130. Since the elements included in the liquid crystal panel 130 excluding the color filter 1350 are described with reference to FIG. 3A, description thereof will not be given.

Referring to FIG. 6, the color filter 1350 filters light that passes through the liquid crystal layer 1340 and converts the filtered light into light components with colors. The color filter 1350 may include a black matrix pattern 1380 for blocking the light that passes through the liquid crystal layer 1340, a red color filter 1351, a green color filter 1352, and a blue color filter 1353. The black matrix pattern 1380 includes a plurality of openings in which the color filters 1351, 1352, and 1353 are respectively arranged. At this time, the red color filter 1351, the green color filter 1352, and the blue color filter 1353 may be alternately arranged. For example, the green color filter 1352 may be arranged to be adjacent to the red color filter 1351 and the blue color filter 1353 may be arranged to be adjacent to the green color filter 1352. In addition, the red color filter 1351 may be arranged to be adjacent to the blue color filter 1353. The red color filter 1351, the green color filter 1352, and the blue color filter 1353 may be alternately arranged in an arbitrary order.

Referring to FIGS. 2 and 6, the light emitted from the backlight 190 and passing through the liquid crystal layer 1340 is converted into the lights with colors while passing through the color filter 1350. At this time, intensity of the light that passes through the color filter 1350 may be controlled by controlling transmittance of the color filter 1350. For example, a white light-emitting diode in which intensities of red light, green light, and blue light are the same may be used for the backlight 190. A first red transmittance 1351a of the red color filter 1351, a first green transmittance 1352a of the green color filter 1352, and a first blue transmittance 1353a of the blue color filter 1353 may be the same when thicknesses and pigment concentrations of the color filters 1351, 1352, and 1353 are the same. The light emitted from the backlight 190 passes through the liquid crystal layer 1340 and then, passes through the red color filter 1351 with the first red transmittance 1351a, the green color filter 1352 with the first green transmittance 1352a, and the blue color filter 1353 with the first blue transmittance 1353a. At this time, reference red light R, reference green light G, and reference blue light B may be formed and the reference red light R, the reference green light G, and the reference blue light B are combined so that the black color coordinate value C may be formed. Here, when intensity of white light emitted from the backlight 190 increases, the reference red light R, the reference green light G, and the reference blue light B that pass through the red color filter 1351, the green color filter 1352, and the blue color filter 1353 are combined so that the white color coordinate value A may be formed.

Figure 7:
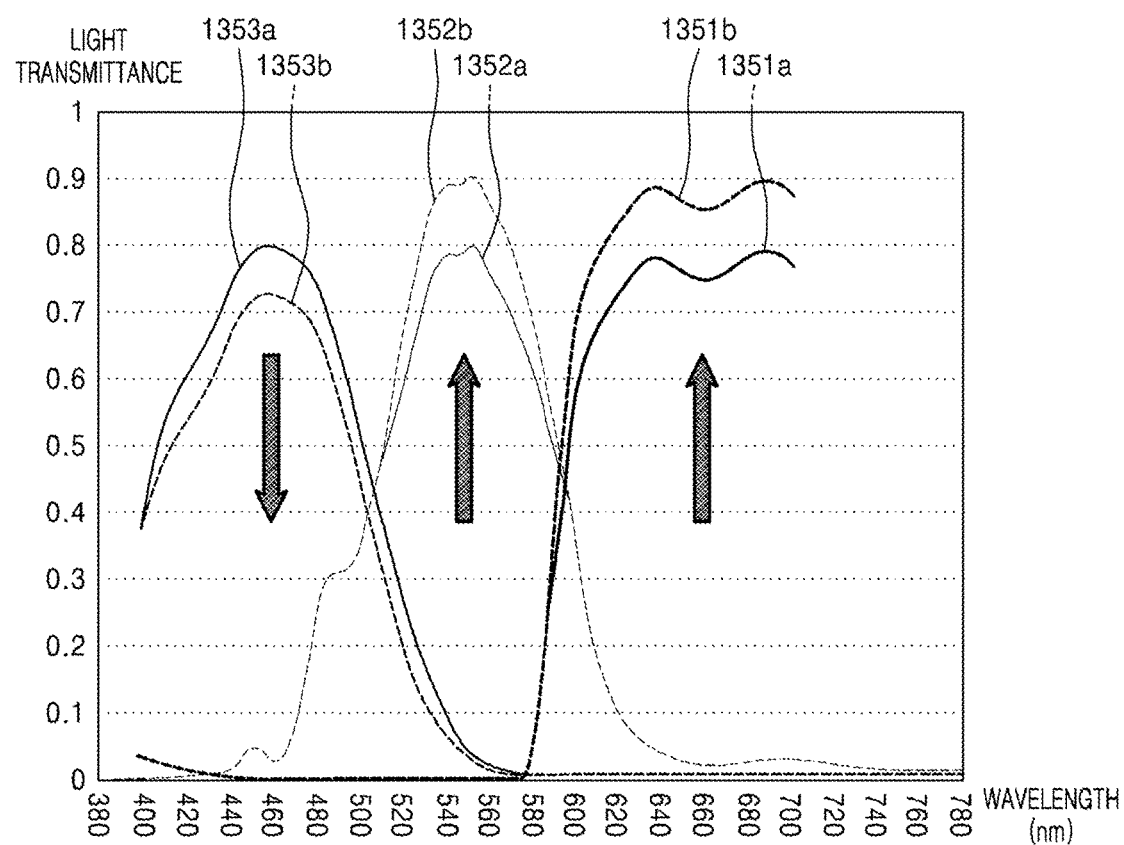
FIG. 7 is a graph with respect to transmittance of a color filter according to an exemplary embodiment.

The black color coordinate value C with respect to the predetermined color on the color coordinates may correspond to the white color coordinate value A by controlling transmittances of the red color filter 1351, the green color filter 1352, and the blue color filter 1353. For example, referring to FIGS. 4, 6, and 7, the thicknesses of the red color filter 1351 and the green color filter 1352 are smaller than that of the blue color filter 1353 or the pigment concentrations of the red color filter 1351 and the green color filter 1352 are smaller than that of the blue color filter 1353 so that the first red transmittance 1351a and the first green transmittance 1352a may increase and the first blue transmittance 1353a of the blue color filter 1353 may be reduced. Therefore, a second red transmittance 1351b and a second green transmittance 1352b of the red color filter 1351 and the green color filter 1352 may be larger than a second blue transmittance 1353b of the blue color filter 1353. The white light emitted from the backlight 190 passes through the red color filter 1351, the green color filter 1352, and the blue color filter 1353 and the red, green, and blue light components obtained by converting the white light are combined so that the black color coordinate value C with respect to the predetermined color on the color coordinates may correspond to the white color coordinate value A.

As described above, the black color coordinate value C may correspond to the white color coordinate value A by correcting the light intensity of the backlight 190 or the transmittance of the color filter 1350. The color coordinates C⇆A including the intermediate grayscales may correspond to the white color coordinate value A by controlling the data voltages $V_R$, $V_G$, and $V_B$ of the data driver 140 illustrated in FIG. 1 and thus, correcting the liquid crystal transmittance T of the liquid crystal layer. Therefore, the color coordinates on all the grayscales including the black color coordinate value C may correspond to the white color coordinate value A so that the color coordinates may be completely compensated for.

Figure 8:
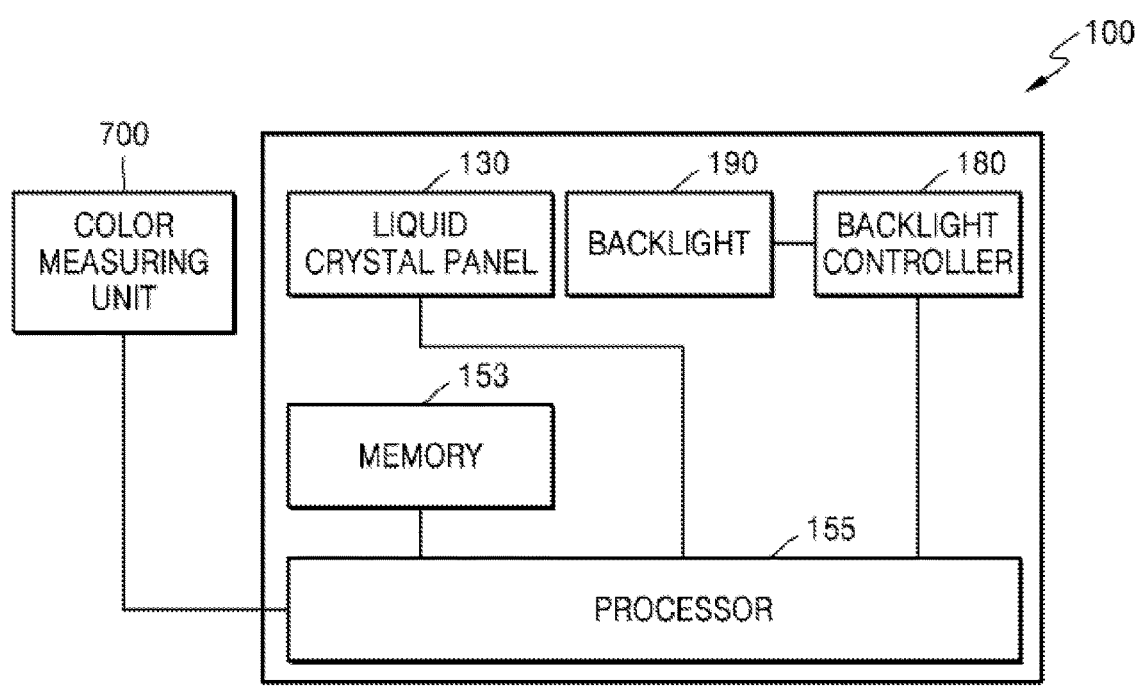
FIG. 8 is a block diagram of the liquid crystal display apparatus and a color measuring unit according to an exemplary embodiment.
Figure 9:
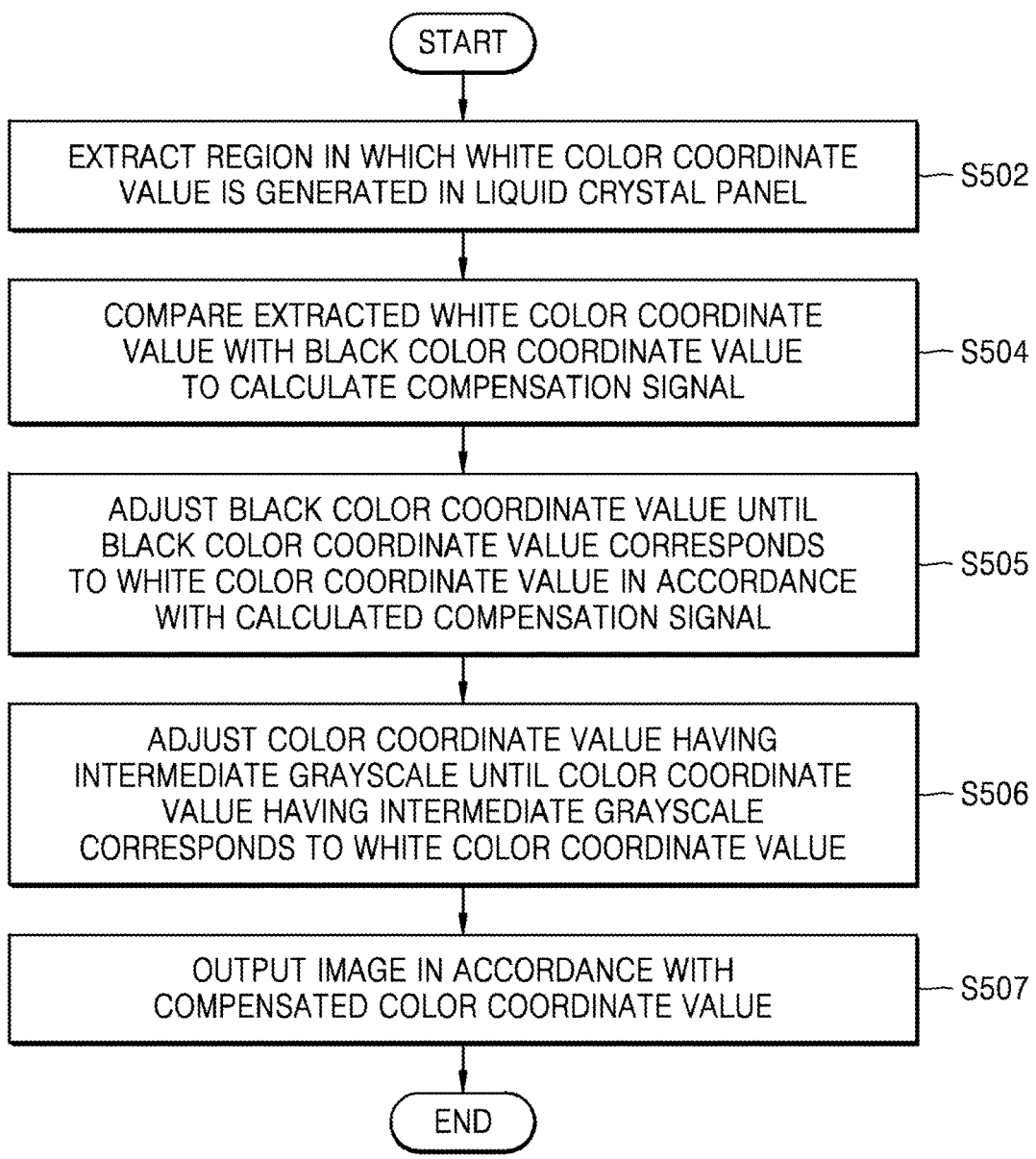
FIG. 9 is a flowchart of a method of driving the liquid crystal display apparatus according to an exemplary embodiment.

FIG. 8 is a block diagram of the liquid crystal display apparatus 100 and a color measuring unit 700 according to an exemplary embodiment. FIG. 9 is a flowchart of a method of driving a liquid crystal display apparatus according to an exemplary embodiment.

Referring to FIGS. 8 and 9, a region in which non-coincidence of color coordinates in accordance with a dispersion characteristic of liquid crystal is generated is extracted by analyzing the color coordinates generated in the liquid crystal panel 130 of the liquid crystal display apparatus 100 by using the color measuring unit 700 in operation S502.

The color measuring unit 700 measures a difference in color of an image output to the liquid crystal panel 130 and may output the image as XYZ color coordinates. An image of the white color coordinate value A illustrated in FIG. 4 may be output to the liquid crystal panel 130 and a region in which the white color coordinate value A is generated is extracted in a state where an image in which all the RGBs have the grayscale 255 is output.

A processor 155 compares the white color coordinate value A extracted by using the color measuring unit 700 with the black color coordinate value C including the same color stored in a memory 153 and generates a compensation signal for compensating for the color coordinates in operation S504.

The processor 155 may be implemented in the form of one microprocessor module or in the form in which two or more microprocessor modules are combined. That is, the implementation form of the processor 155 is not limited to anyone.

The compensation signal generated by the processor 155 is transmitted to an apparatus for compensating for a color coordinate value and may compensate for the color coordinate value in operation S505.

As an example, the compensation signal may be the light intensity of the backlight 190 controlled by the backlight controller 180. As illustrated in FIG. 5, when the light intensity of the light source that applies the blue light is made smaller than the light intensity in the black color coordinate value C and the light intensities of the light sources that apply the green light and the red light are made larger than the light intensity in the black color coordinate value C, the black color coordinate value C may correspond to the white color coordinate value A.

As another example, the compensation signal may be the transmittance of the color filter 1350. For example, when the transmittances of the red light and the green light are controlled to be larger than the transmittance of the blue light based on the compensation signal transmitted by the processor 155, non-coincidence between the black color coordinate value C and the white color coordinate value A may be compensated for. At this time, the transmittance of the color filter 1350 may be controlled by controlling the thickness or the pigment concentration of the color filter 1350.

The color coordinates C⇌A including the intermediate grayscales may correspond to the white color coordinate value A by controlling the data voltages $V_R$, $V_G$, and $V_B$ of the data driver 140 and thus, correcting the liquid crystal transmittance T of the liquid crystal layer in operation S506.

With respect to the compensated color coordinates, the data driver 140 and the gate driver 150 transmit the gate signals and the data voltages to the liquid crystal panel 130 and may output an image having all the grayscales in operation S507.

It should be understood that the exemplary embodiments described therein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. A liquid crystal display apparatus comprising:
   a backlight configured to emit red light, green light, and blue light for forming an image;
   a liquid crystal panel including a plurality of pixels through which light components supplied by the backlight respectively pass, configured to control transmittances of the plurality of pixels to form an image; and
   a backlight controller configured to control respective intensities of the red light, the green light, and the blue light emitted by the backlight,
   wherein the backlight controller is configured to compensate for a black color coordinate value generated with respect to a predetermined color by controlling the backlight such that a second red light intensity and a second green light intensity are larger than a first red light intensity and a first green light intensity and a second blue light intensity are smaller than a first blue light intensity.

2. The liquid crystal display apparatus of claim 1, wherein the backlight controller is configured to control the backlight so that any change of a white color coordinate value and the compensated black color coordinate value generated with respect to the predetermined color remain within a predetermined range.

3. The liquid crystal display apparatus of claim 2, further comprising a data driver configured to control data voltages applied to the plurality of pixels and control transmittances of the plurality of pixels,
   the data driver is configured to control the data voltages so that a color coordinate value having an intermediate grayscale with respect to the predetermined color corresponds to the white color coordinate value.

4. The liquid crystal display apparatus of claim 2, further comprising a memory configured to store color coordinates.

5. The liquid crystal display apparatus of claim 4, further comprising a color measuring unit configured to measure the change of the white color coordinate value with respect to the color coordinates stored in the memory.

6. The, liquid crystal display apparatus of claim 5, further comprising a processor configured to control the color measuring unit to measure the change of the white color coordinate value.

7. The liquid crystal display apparatus of claim 6, the processor controlling the liquid crystal panel, the backlight controller, and the memory.

8. The liquid crystal display apparatus of claim 1, wherein the backlight comprises a red light-emitting diode configured to emit the red light, a green light-emitting diode configured to emit the green light, and a blue light-emitting diode configured to emit the blue light.

9. The liquid crystal display apparatus of claim 8, wherein the backlight controller is configured to control currents applied to the red light-emitting diode, the green light-emitting diode, and the blue light-emitting diode to control the intensity of the red light, the intensity of the green light, and the intensity of the blue light.

10. A liquid crystal display apparatus comprising:
    a liquid crystal panel including a plurality of pixels; and a backlight configured to emit light toward the liquid crystal panel, wherein each of the plurality of pixels comprises a liquid crystal layer and red, green, and blue color filters configured to filter light that passes through the liquid crystal layer and transmit red, green, and blue light components, and transmittance of the blue color filter is smaller than that of the green color filter and that of the red color filter.

11. The liquid crystal display apparatus of claim 10, wherein the transmittances of the blue color filter, the green color filter, and the red c r filter are determined so that any change in a color coordinate value of a predetermined color remain within a predetermined range during a change from a black color coordinate value to a white color coordinate value.

12. The liquid crystal display apparatus of claim 11, wherein the liquid crystal panel further comprises a data driver configured to control data voltages applied to the plurality of pixels and control transmittances of the plurality of pixels, the data driver is configured to control the data voltages so that a color coordinate value generated when an intermediate grayscale is formed with respect to the predetermined color corresponds to the white color coordinate value.

13. The liquid crystal display apparatus of claim 10, wherein the blue color filter is thicker than the green color filter and thicker than the red color filter.

14. A method of driving a liquid crystal display apparatus having a backlight configured to emit red light, green light, and blue light for forming an image, a liquid crystal panel including a plurality of pixels through which light components supplied by the backlight respectively pass, configured to control transmittances of the plurality of pixels to form an image, and a backlight controller configured to control respective intensities of the red light, the green light, and the blue light emitted by the backlight, wherein the backlight controller is configured to compensate for a black color coordinate value generated with respect to a predetermined color by controlling the backlight such that a second red light intensity and a second green intensity are larger than a first red light intensity and a first green light intensity and a second blue light intensity is smaller than a first blue light intensity, the method comprising:

measuring a white color coordinate value;

comparing a black color coordinate value stored in a memory with the white color coordinate value to calculate a compensation signal; and adjusting the black color coordinate value based on the compensation signal until the black color coordinate value corresponds to the white color coordinate value.

15. The method of claim 14, further comprising, adjusting a color coordinate value until the color coordinate value having an intermediate grayscale corresponding to the white color coordinate value.

16. The method of claim 14, wherein the compensation signal is calculated by detecting a first red light intensity, a first green light intensity, and a first blue light intensity at a black color coordinate value, making a second red light intensity and a second green light intensity larger than the first red light intensity and the first green light intensity at the black color coordinate value, and making a second blue light intensity smaller than the first blue light intensity at the black color coordinate value.

* * * * *